US 9,609,263 B2

(12) United States Patent
Nagasawa et al.

(10) Patent No.: US 9,609,263 B2
(45) Date of Patent: Mar. 28, 2017

(54) OPTICAL UNIT AND PROJECTIVE DISPLAY DEVICE

(71) Applicant: HITACHI-LG DATA STORAGE, INC., Tokyo (JP)

(72) Inventors: Mitsuru Nagasawa, Tokyo (JP); Kunikazu Onishi, Tokyo (JP); Satoshi Ouchi, Tokyo (JP); Toshiteru Nakamura, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 142 days.

(21) Appl. No.: 14/191,674

(22) Filed: Feb. 27, 2014

(65) Prior Publication Data

US 2014/0320826 A1 Oct. 30, 2014

(30) Foreign Application Priority Data

Apr. 26, 2013 (JP) ................................. 2013-093208

(51) Int. Cl.
*G03B 21/28* (2006.01)
*G02B 5/04* (2006.01)
(Continued)

(52) U.S. Cl.
CPC ............. *H04N 5/7458* (2013.01); *G02B 5/04* (2013.01); *G02B 27/1033* (2013.01);
(Continued)

(58) Field of Classification Search
CPC .. G03B 21/008; G03B 21/28; G03B 21/2033; G03B 21/2013; G02B 5/04;
(Continued)

(56) References Cited

U.S. PATENT DOCUMENTS

2004/0008402 A1 1/2004 Patel et al.
2005/0219847 A1* 10/2005 Ikeda .................... G02B 3/0056
362/268
(Continued)

FOREIGN PATENT DOCUMENTS

JP 2004-240050 A 8/2004
JP 2005-292293 A 10/2005
(Continued)

*Primary Examiner* — William C Dowling
*Assistant Examiner* — Ryan Howard
(74) *Attorney, Agent, or Firm* — Baker Botts L.L.P.

(57) ABSTRACT

In an optical unit of a projective display device which projects light source light reflected by a DMD, one prism of TIR prisms has a first boundary surface which is arranged in parallel to an emission surface of the light source light of other prism at a predetermined distance and on which the light source light from other prism is incident and a second boundary surface which is provided to face the DMD and emits the light source light illuminating the DMD and on which reflected light from the DMD is incident. When a swinging angle of minute mirrors of the DMD is set as $\pm\theta$, a refractive index of the prisms is set as n, an angle formed by the first boundary surface and the second boundary surface is set as $\beta$, and an emission angle of the light source light with respect to the DMD in the second boundary surface is set as $\alpha$, the swinging angle $\theta$, the refractive index n, the angle $\beta$, and the angle $\alpha$ satisfy a predetermined relation.

6 Claims, 20 Drawing Sheets

(51) Int. Cl.
*G02B 27/12* (2006.01)
*H04N 5/74* (2006.01)
*G02B 27/10* (2006.01)
*G02B 27/14* (2006.01)
*H04N 9/31* (2006.01)
*G03B 21/00* (2006.01)
*G03B 21/20* (2006.01)
*G03B 33/12* (2006.01)

(52) U.S. Cl.
CPC ........... *G02B 27/14* (2013.01); *G03B 21/008* (2013.01); *G03B 21/208* (2013.01); *H04N 9/315* (2013.01); *G02B 27/126* (2013.01); *G03B 21/2033* (2013.01); *G03B 21/28* (2013.01); *G03B 33/12* (2013.01)

(58) Field of Classification Search
CPC .... G02B 27/126; G02B 27/12; H04N 9/3111; H04N 9/3114; H04N 9/3117
USPC .................. 353/33, 81, 98, 99; 359/831, 833
See application file for complete search history.

(56) References Cited

U.S. PATENT DOCUMENTS

| | | | |
|---|---|---|---|
| 2009/0067072 A1* | 3/2009 | Kao | G02B 5/04 359/834 |
| 2009/0116039 A1 | 5/2009 | Hidaka | |
| 2013/0021583 A1* | 1/2013 | Lin | G03B 21/2033 353/33 |
| 2013/0182230 A1* | 7/2013 | Lin | G03B 21/28 353/81 |
| 2013/0242272 A1* | 9/2013 | Baba | G03B 21/008 353/81 |

FOREIGN PATENT DOCUMENTS

| | | |
|---|---|---|
| JP | 2006-528794 A | 12/2006 |
| JP | 2007-165859 A | 6/2007 |
| JP | 2010-096840 A | 4/2010 |

* cited by examiner

OPTICAL UNIT AND PROJECTIVE DISPLAY DEVICE

CROSS-REFERENCE TO RELATED APPLICATIONS

This application claims the Japanese Patent Application No. 2013-093208 filed on Apr. 26, 2013, which is incorporated herein by reference in its entirety.

BACKGROUND OF THE INVENTION

1. Field of the Invention

The present invention relates to an optical unit that includes at least two prisms and facilitates adjustment of an optical axis of incident/reflected light of a reflective display element such as a DMD and a projective display device.

2. Description of the Related Art

In a projective display device, that is, a projector, attention has been paid to a digital micromirror device (DMD) to be a micromirror type video display element as a video display element that can realize an optical unit having a small size and high brightness. The DMD individually controls a swinging angle of a micromirror arranged for each pixel according to video information, separates DMD incident light into a direction (ON light) in which the incident light is made to be incident on a projective lens and a direction (OFF light) in which the incident light is made not to be incident on the projective lens, and performs light modulation corresponding to the video information.

In an optical system of the optical unit using the DMD, it is necessary to make light incident in a state in which an optical axis of the DMD incident light is inclined by a predetermined amount with respect to a surface normal of the DMD, so as to make optical axes of the DMD incident light and the DMD reflected light different from each other. Here, when a rotation angle of a mirror of the DMD is inclined by $+\theta$ at the time of ON and is inclined by $-\theta$ at the time of OFF, the DMD incident light is generally incident in a state in which the optical axis of the incident light is inclined by $2\theta$ with respect to a center optical axis of the DMD.

As one method of an optical configuration to radiate light to the DMD, a method (hereinafter, referred to as a total reflection prism method) using two triangular prisms of a total reflection prism and a correction prism has been known. In the total reflection prism method, generally, the DMD incident light is made to be incident on the micromirror of the DMD after the DMD incident light is made to transmit the correction prism and the total reflection prism. Meanwhile, the DMD reflected light is totally reflected by a total reflection surface of the total reflection prism and the light is propagated in a projective lens direction, thereby separating a light path of the DMD incident light and a light path of the DMD reflected light. In addition, the correction prism has a function of correcting a light path difference generated by the two prisms by positions of light rays passing through the total reflection prism. Because the total reflection prism method can efficiently separate the DMD incident light and the DMD reflected light, the total reflection prism method becomes a method that is suitable for miniaturization of an optical unit for a projector.

For example, a projector that radiates light source light to the DMD by the total reflection prism is disclosed in JP-2004-240050-A.

SUMMARY OF THE INVENTION

In the total reflection prism method described above, total reflection surface of the total reflection prism is generally arranged at an angle of 45° with respect to a mirror surface of the DMD. However, if light beams corresponding to a predetermined F number of the DMD are taken to secure brightness, a part of the reflected light reflected from the DMD may be incident on the total reflection surface of the total reflection prism at an angle smaller than a critical angle and transmit the total reflection prism. As a result, there occurs a problem in that efficiency of the entire optical unit is degraded and illuminance on a screen decreases.

In order to resolve the problem, technology for forming the total reflection prism such that the total reflection surface of the total reflection prism forms an angle of 45° or more with respect to the mirror surface of the DMD and improving the problem is described in JP-2004-240050-A. According to this technology, a critical angle can be secured in effective reflected light and an image quality can be prevented from being deteriorated.

However, in JP-2004-240050-A, only improvement of the total reflection condition of the total reflection prism is considered and efficiency of the DMD incident light is not mentioned. As in content disclosed in JP-2004-240050-A, if the total reflection surface of the total reflection prism forms the angle of 45° or more, there occurs a new problem in that efficiency degradation newly occurs in the correction prism which the DMD incident light passes through and efficiency of the optical unit is not improved when optical efficiency of both the DMD incident light and the DMD reflected light of the DMD is considered.

The present invention has been made in view of the above-described circumstances and an object of the present invention is to provide an optical unit that improves efficiency of light incident on a DMD and efficiency of light reflected from the DMD at the same time and realizes high brightness and a projective display device including the same.

An aspect of the present invention provides an optical unit of a projective display device on which light source light is incident and which projects the light source light reflected by a video display element. The optical unit includes a plurality of prisms each having a refraction surface or a total reflection surface of the light source light, wherein one prism of the plurality of prisms has a first boundary surface which is arranged in parallel to an emission surface of the light source light of other prism at a predetermined distance and on which the light source light from other prism is incident and a second boundary surface which is provided to face the video display element and emits the light source light illuminating the video display element and on which reflected light from the video display element is incident; when a refractive index of the prism is set as n, an angle formed by the first boundary surface and the second boundary surface is set as $\beta$, an emission angle of the light source light with respect to the video display element in the second boundary surface is set as $\alpha$, and an incidence angle of the reflected light from the video display element in the second boundary surface is set as $\epsilon$, the refractive index n, the angle $\beta$, the angle $\alpha$, and the angle $\epsilon$ satisfy a predetermined relation; and the reflected light from the video display element which has been incident from the second boundary surface is totally reflected by the first boundary surface.

In addition, in the case in which the video display element is a video display element including a plurality of minute mirrors swinging at a predetermined angle, when a swinging angle of the minute mirrors of the video display element is set as $\pm\theta$, a refractive index of the prisms is set as n, an angle formed by the first boundary surface and the second boundary surface is set as $\beta$, and an emission angle of the light source light with respect to the video display element in the second boundary surface is set as α, the swinging angle θ, the refractive index n, the angle β, and the angle α satisfy a predetermined relation; and the reflected light from the video display element which has been incident from the second boundary surface is totally reflected by the first boundary surface.

According to the present invention, an optical unit for a projector that improves efficiency of light incident on a DMD and efficiency of light reflected from the DMD at the same time and realizes high brightness and a projective display device including the same can be provided.

DESCRIPTION OF THE PREFERRED EMBODIMENTS

Figure 1:
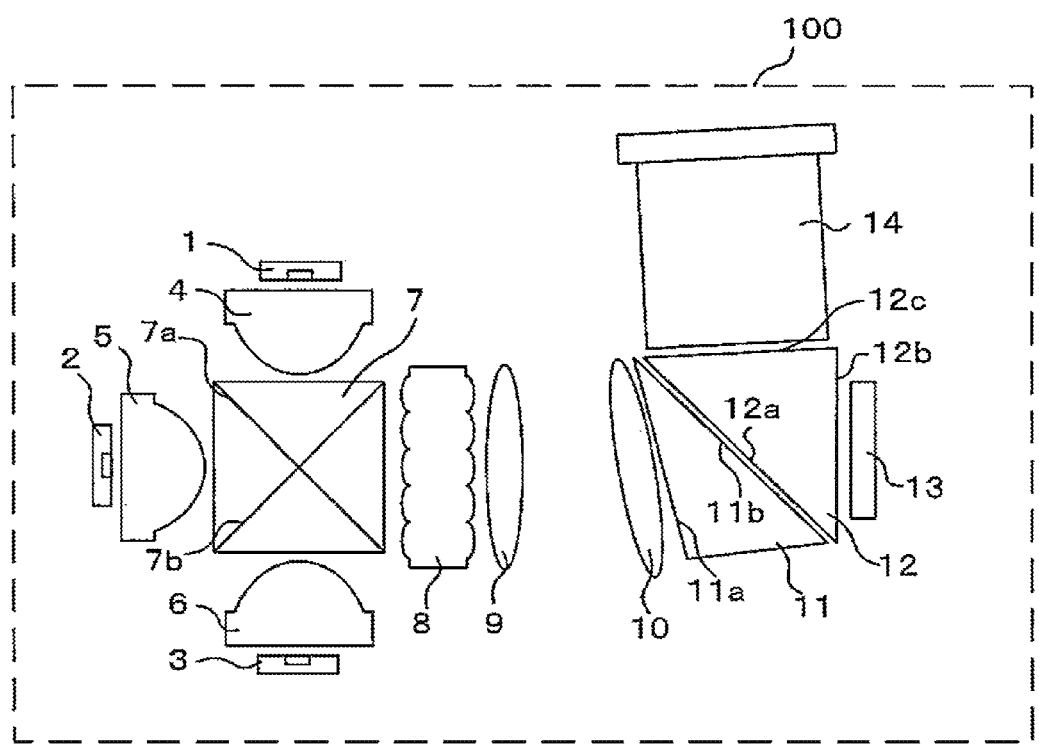
FIG. 1 is a diagram illustrating a schematic configuration of an optical unit according to an embodiment.

Hereinafter, an example of an embodiment of an optical unit to which the present invention is applied and a projective display device including the optical unit will be described using the drawings. However, the present invention is not limited by the following description. In the drawings, like reference numerals refer to like parts throughout.

A total reflection prism in this embodiment is suitable for a method of transmitting incident light, guiding the incident light to a video display element, totally reflecting light reflected from the video display element by a total reflection surface, and guiding the light to a projective lens. Also, a method of totally reflecting the incident light by the total reflection surface, guiding the incident light to the video display element, transmitting the light reflected from the video display element, and guiding the light to the projective lens exists. However, because the method is not matched with a condition described in this embodiment, the method is not included in a range of the present invention.

First Embodiment

FIG. 1 is a diagram illustrating a schematic configuration of an optical unit according to an embodiment. A first embodiment illustrates an example of an optical unit of a projective display device of a single plate type in which a light source is prepared for each of three wavelengths, the light source is driven in time series, and light source light for each wavelength is radiated to a DMD. A configuration of the optical unit is not limited to the configuration of FIG. 1. For example, the optical unit may use a configuration in which a high-pressure mercury lamp is used as a light source and colors are separated by a color wheel. In addition, the present invention can be applied to a DMD optical unit of a projective display device of a three plate type or an optical unit using a reflective liquid crystal device.

In an optical unit 100, light sources 1, 2, and 3 that emit light beams of a predetermined wavelength or wavelength band are arranged. The light source 1 is an LED light source that emits a red light beam of which a center wavelength is about 615 nm. The light source 2 is an LED light source that emits a green light beam of which a center wavelength is about 525 nm. The light source 3 is an LED light source that emits a blue light beam of which a center wavelength is about 460 nm. If three primary colors can be visualized, each center wavelength may not be the above value.

The light beams emitted from the light sources 1, 2, and 3 are converted into approximately parallel light by condensing lenses 4, 5, and 6, respectively, and are incident on a cross dichroic prism 7 from different directions.

The cross dichroic prism 7 includes a wavelength selecting mirror surface 7a that has a function of reflecting a red light beam and transmitting a blue light beam and a green light beam and a wavelength selecting mirror surface 7b that has a function of reflecting a blue light beam and transmitting a red light beam and a green light beam. The cross dichroic prism 7 has a function of synthesizing the light beams of the three colors incident on the cross dichroic prism 7.

The light beam that has been synthesized by the cross dichroic prism 7 is incident on a correction prism 11 through a lens array 8 in which a lens array including a plurality of lenses is provided on an incidence side and an emission side and relay lenses 9 and 10. These optical elements have a function of generating illumination light having uniform illuminance and propagating the illumination light at a desired angle. However, the present invention is not limited to a configuration including the lens array 8 and the relay lenses 9 and 10 illustrated in FIG. 1 and may use an optical system having another configuration.

The light beam that has passed through the relay lens 10 passes through an incidence surface 11a and an emission surface 11b of the correction prism 11, passes through an inclined surface 12a and a surface 12b of a total reflection prism 12, and is radiated to the DMD 13. The correction prism 11 has a function of correcting the light path difference generated by the total reflection prism 12 and minimizing a light path length difference of a light beam incident on each place on a DMD panel. In order to efficiently perform light propagation, the emission surface 11b of the correction prism 11 and the inclined surface 12a of the total reflection prism 12 are parallel to each other and an air gap of a predetermined interval is provided between the emission surface 11b and the inclined surface 12a.

A light beam that has been reflected from a micromirror surface of the DMD 13 passes through the surface 12b of the total reflection prism again at a changed angle and is totally reflected from the inclined surface 12a. Because a maximum feature of the inclined surface 12a is to totally reflect the DMD reflected light, the inclined surface 12a is called a total reflection surface hereinafter. The light beam that has been received from the total reflection surface 12a passes through the surface 12c and displays video enlarged and projected on a screen (not illustrated in the drawings) through a projective lens 14.

This embodiment provides a configuration in which total efficiency loss of the DMD incident light and the DMD reflected light can be removed by the total reflection prism and the correction prism.

Next, the detail of a light path of incident light that is transmitted from the correction prism 11 to the total reflection prism 12 and is radiated to the DMD 13 will be described using FIG. 2. In the following drawings, the micromirror surface when the micromirror of the DMD 13 is at a neutral position and the surface 12b of the total reflection prism 12 are provided in parallel to each other and the micromirror surface when the micromirror of the DMD 13 is at the neutral position is set as a reference surface in an absolute coordinate system.

Figure 2:
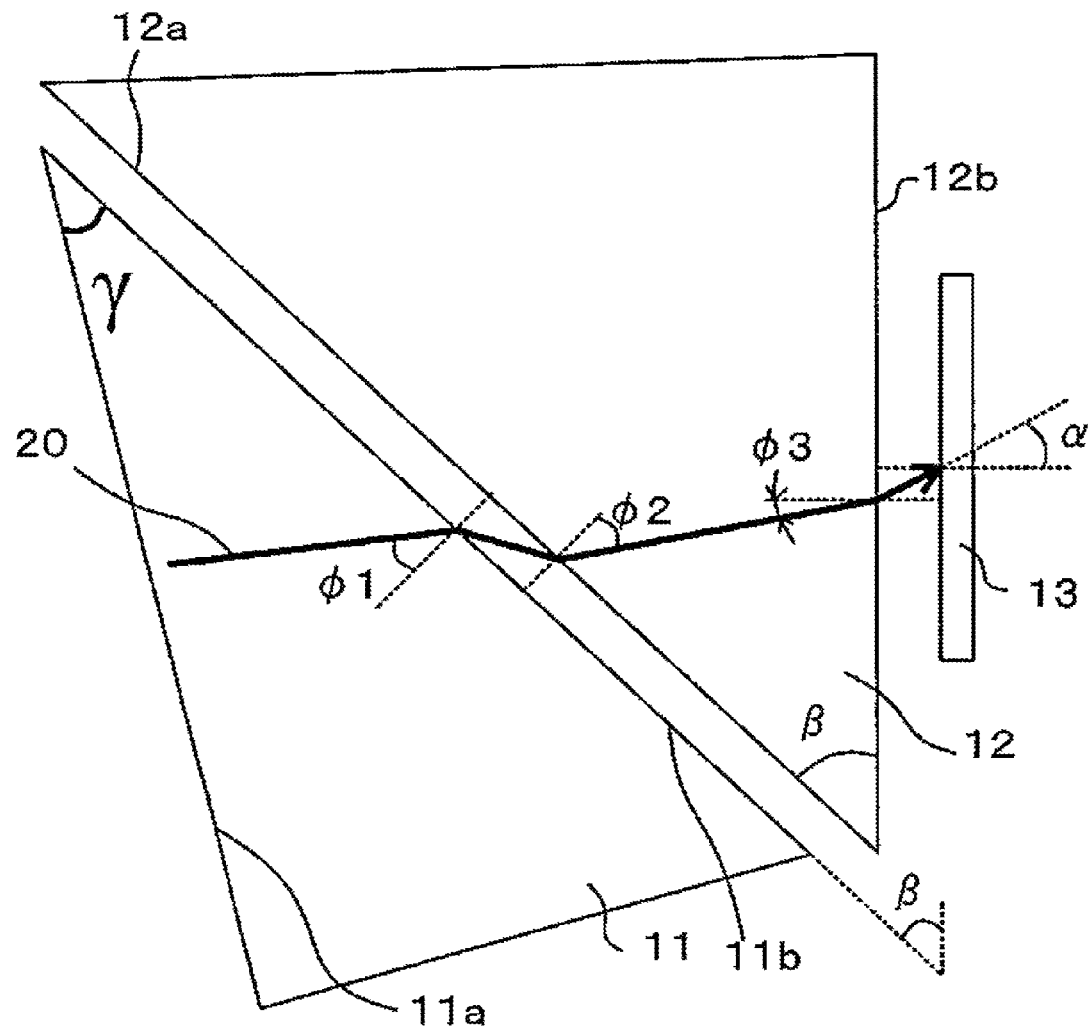
FIG. 2 is a diagram illustrating DMD incident light and an incidence/emission angle of each boundary surface according to the embodiment.

FIG. 2 illustrates a relation of incidence and emission angles until a principal light ray 20 of the DMD incident light having passed through the incidence surface 11a of the correction prism 11 reaches the DMD 13. Here, a refractive index of the total reflection prism 12 is set as n1 and a refractive index of the correction prism 11 is set as n2. As illustrated in FIG. 2, a vertex angle (an angle formed by the total reflection surface 12a and the surface 12b) of the total reflection prism is set as β and an angle of the principal light ray of the incident light with respect to a normal of the DMD surface is set as α.

If an incident angle of the principal light ray 20 of the DMD incident light with respect to the emission surface 11b of the correction prism is set as φ1 and a refraction angle when the principal light ray 20 of the DMD incident light has been refracted from the total reflection surface 12a of the total reflection prism 12 is set as φ2, because the emission surface 11b of the correction prism and the total reflection surface 12a of the total reflection prism 12 are parallel to each other as illustrated in the drawings, a relation of an expression (1) is realized on the basis of a law of refraction.

$$n2 \cdot \sin \phi1 = n1 \cdot \sin \phi2 \quad (1)$$

Next, if an incidence angle of the principal light ray 20 of the DMD incident light with respect to the surface 12b is set as φ3, an expression (2) is realized.

$$\phi2 + \phi3 = \beta \quad (2)$$

In addition, if a refraction angle when the principal light ray 20 of the DMD incident light has been refracted from the surface 12b of the total reflection prism 12, that is, an incidence angle of the principal light ray 20 of the DMD incident light with respect to the DMD 13 is set as α, a relation of an expression (3) is realized.

$$n1 \cdot \sin \phi3 = \sin \alpha \quad (3)$$

Figure 3:
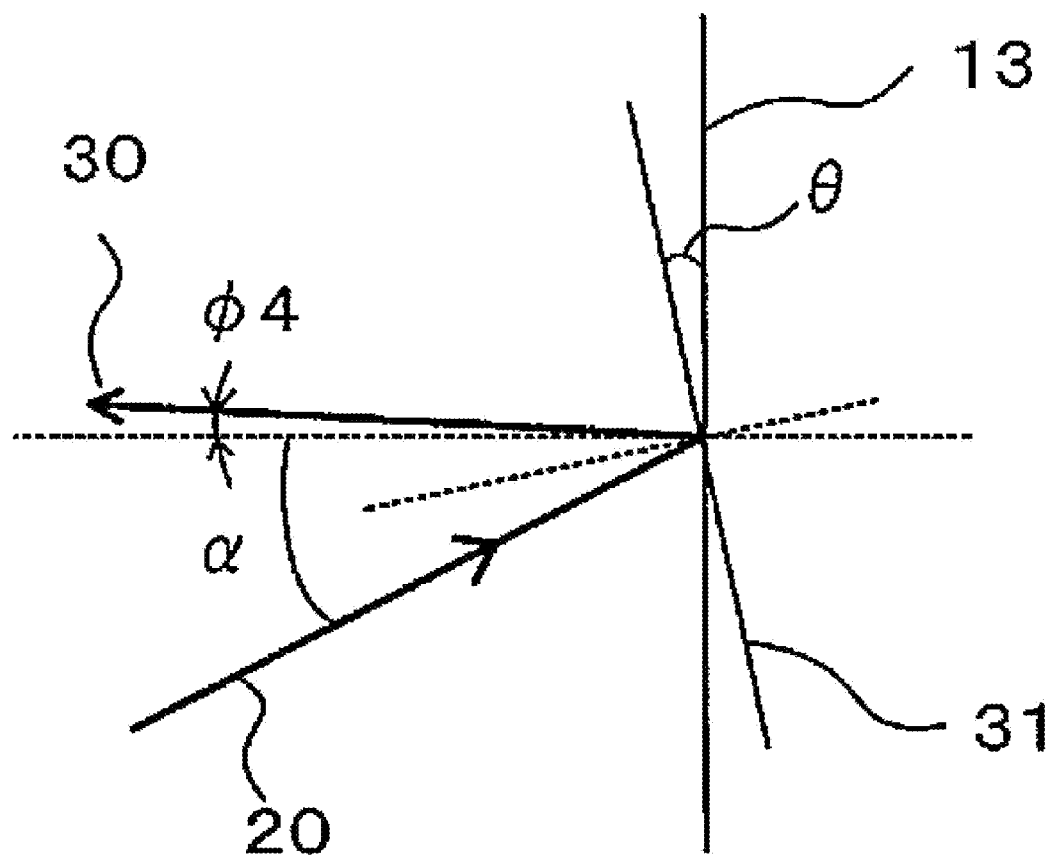
FIG. 3 is a schematic diagram illustrating a relation of incidence and reflection of a light ray in a DMD micromirror according to the embodiment.

FIG. 3 is a light ray diagram illustrating a relation of incidence and reflection of a principal light ray for one micromirror in the DMD 13. A principal light ray of DMD incident light is set as 20, a principal light ray of DMD reflected light is set as 30, and a rotation angle of the DMD micromirror 31 is set as ±θ. When the DMD 13 displays ON light, that is, light is made to propagate in the projective lens, the micromirror 31 reflects incident light in a state in which a counter-clockwise direction is set as a positive direction and the incident light is incident by +θ with respect to the DMD surface, as illustrated in FIG. 3. At this time, if an angle of the reflected light with respect to the DMD normal is set as φ4, φ4 is represented by an expression (4) using an inclination angle θ of the micromirror 31 and an incidence angle α of the principal light ray of the DMD incident light.

$$\phi4 = \alpha - 2\theta \quad (4)$$

Figure 4:
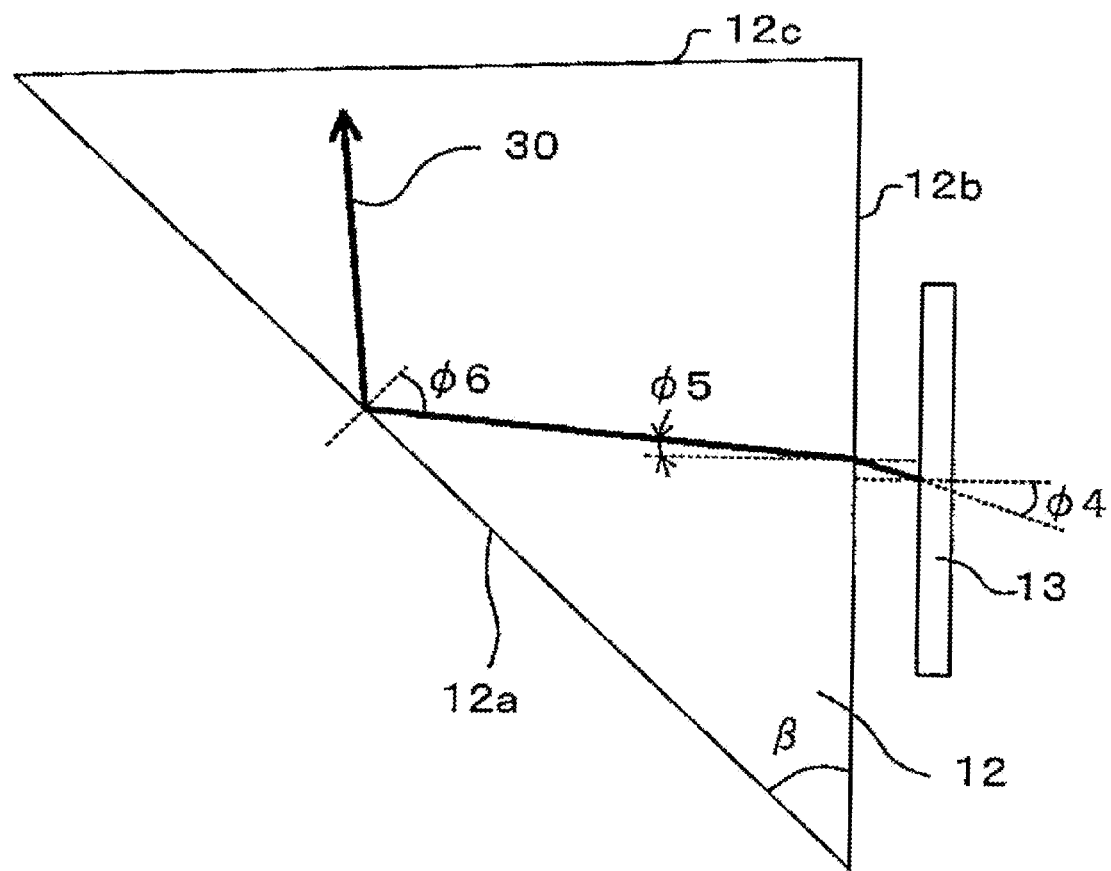
FIG. 4 is a diagram illustrating a relation of DMD reflected light and an incidence/emission angle of each boundary surface according to an embodiment.

FIG. 4 illustrates a relation of incidence and emission angles until the principal light ray 30 of the DMD reflected light reflected from the DMD 13 reaches the surface 12c in front of the projective lens via the total reflection surface 12a of the total reflection prism 12. First, if a refraction angle formed when the principal light ray 30 of the DMD reflected light is incident on the surface 12b again is set as φ5, a relation of an expression (5) is realized.

$$\sin \phi4 = n1 \cdot \sin \phi5 \quad (5)$$

Next, if an incidence angle of the principal light ray 30 of the DMD reflected light with respect to the total reflection surface 12a is set as φ6, an expression (6) is realized.

$$\beta + \phi5 = \phi6 \quad (6)$$

Here, in order to remove total efficiency loss of the DMD incident light and the DMD reflected light, two conditions are necessary. The first condition is that the DMD reflected light is totally reflected by the total reflection surface 12a of the total reflection prism 12. The second condition is that the DMD incident light is not totally reflected by the emission surface 11b of the correction prism 11, that is, the DMD incident light is totally transmitted. In order to satisfy the two conditions, a consideration of the incidence angle α of the principal light ray of the DMD incident light as well as changing the vertex angle β of the total reflection prism is necessary. In JP-2004-240050-A described above, the former condition is considered, but the latter condition is not considered.

Under these conditions, as the light ray angle, it is necessary to consider a light ray angle in light beams having a spread of a predetermined effective F number, not the angle of the principal light ray of the DMD incident light. When a rotation angle of the DMD is ±θ, a spread of effective light beams that can be taken when the DMD incident light and the DMD reflected light are efficiently separated is light beams in a range of +θ to −θ with respect to a principal light ray angle. That is, as actual light beams, light beams having a spread of ±θ are propagated.

When an incidence angle of the principal light ray 20 of the DMD incident light is α, light beams of angles from α−θ to α+θ are actually incident as effective light beams. In addition, when a reflection angle of the principal light ray 30 of the DMD reflected light is an angle of ϕ4 with respect to the DMD normal, light beams of angles from ϕ4−θ to ϕ4+θ are actually reflected as effective light beams. For all light rays in the above range, the two conditions need to be satisfied.

A light ray in which it is difficult to satisfy the first condition and an incidence angle with respect to the total reflection surface 12a is smallest, among the effective DMD reflected light beams, is a light ray reflected from the DMD at the angle of ϕ4−θ. In addition, a light ray in which it is difficult to satisfy the second condition and an incidence angle with respect to the emission surface 11b is largest, among the effective DMD incident light beams, is a light ray incident on the DMD at the angle of α−θ. Therefore, these angles are set as conditions of DMD incidence/reflection angles.

On the basis of the above premise, conditions that can remove total efficiency loss of the incident light and the reflected light are derived. First, a condition which is a first condition and in which the DMD reflected light is totally reflected by the total reflection surface 12a of the total reflection prism 12 is that an incidence angle ϕ6 of the DMD reflected light with respect to the total reflection surface 12a becomes larger than a critical angle δ1 of the total reflection prism 12, that is, an expression (7) is satisfied.

$$\phi 6 > \delta 1 \quad (7)$$

The critical angle is represented approximately by $$\delta 1 = \sin^{-1}(1/n1).$$

For the expression (7), the expressions (4) to (6) are substituted. If Φ4−θ to be a light ray angle in which it is most difficult to satisfy the expression (7), among the DMD reflected light angles, is substituted as the DMD reflected light angle, a relation of an expression (8) is finally realized.

$$-\sin(\alpha - 3\theta) < n1 * \sin(\beta - \sin^{-1}(1/n1)) \quad (8)$$

Next, a condition which is a second condition and in which the DMD incident light totally transmits the emission surface 11b of the correction prism 11 is that an incidence angle Φ1 of the DMD incident light with respect to the emission surface 11b becomes smaller than a critical angle δ2 of the correction prism 11, that is, an expression (9) is satisfied.

$$\Phi 1 < \delta 2 \quad (9)$$

The critical angle δ2 is represented by $\delta 2 = \sin^{-1}(1/n2)$.

For the expression (9), the expressions (1) to (3) are substituted. If α−θ to be a light ray angle in which it is most difficult to satisfy the expression (9), among the DMD incident light angles, is substituted as the DMD incident light angle, a relation of an expression (10) is finally realized.

$$\sin(\alpha - \theta) > n1 * \sin(\beta - \sin^{-1}(1/n1)) \quad (10)$$

Here, it should be noted that the refractive index n2 or the critical angle δ2 of the correction prism 11 is not substituted for the expression (10). That is, it means that the two conditions do not depend on a glass material of the correction prism 11.

From the expressions (8) and (10), a condition of the total reflection prism necessary for removing total efficiency loss of the DMD incident light and the DMD reflected light can be represented by an expression (11).

$$-\sin(\alpha - 3\theta) < n1 * \sin(\beta - \sin^{-1}(1/n1)) < \sin(\alpha - \theta) \quad (11)$$

By the configuration of the total reflection prism of the incidence angle α and the vertex angle β satisfying the above range, both the DMD incident light and the DMD emitted light can be propagated without loss Therefore, an image on a screen is bright and a high-brightness projector can be realized.

In addition, it is needless to say that an angle (angle γ in FIG. 2) formed by the incidence surface 11a and the emission surface 11b of the correction prism 11 is set as an angle at which a light path length difference of the incident light 20 incident on both ends of the DMD 13 is minimized. By minimizing the light path length difference, incident light is focused on the DMD 13, so that light does not become dim and the light can be efficiently propagated.

In addition, an incidence angle of the incident light 20 with respect to the correction prism 11 can be set by the relay lens 10. By inclining or offsetting the relay lens 10, the incidence angle can be freely set. Therefore, it is needless to say that the arrangement and the shape of the relay lens 10 are not limited to the arrangement and the shape illustrated in FIG. 1.

In addition, the correction prism 11 and the relay lens 10 may be integrated. The correction prism 11 and the relay lens 10 are integrated and the incidence surface 11a of the correction prism 11 is made to have a lens curved surface shape, so that the number of components can be decreased and a low cost and a transmittance improvement can be realized.

Next, ranges of the refractive index n1 and the vertex angle β of the total reflection prism that can be configured and the DMD incidence angle α, when a rotation angle ±θ of the DMD existing in actuality is assumed, will be described using FIGS. 5A to 8D.

FIGS. 5A to 5D are graphs illustrating a relation of the vertex angle β of the total reflection prism and the DMD incidence angle α with respect to the refractive index n1 of the total reflection prism, when the DMD rotation angle θ is in a range of 11° to 13° and the DMD rotation angle θ=12° is assumed as a representative value. When the DMD rotation angle is ±12°, a light beam of ±12° is input to the principal light ray of the DMD incident light, so that maximum brightness can be realized. This means that a light beam is a light beam corresponding to an F number of 2.4.

Figure 5A:
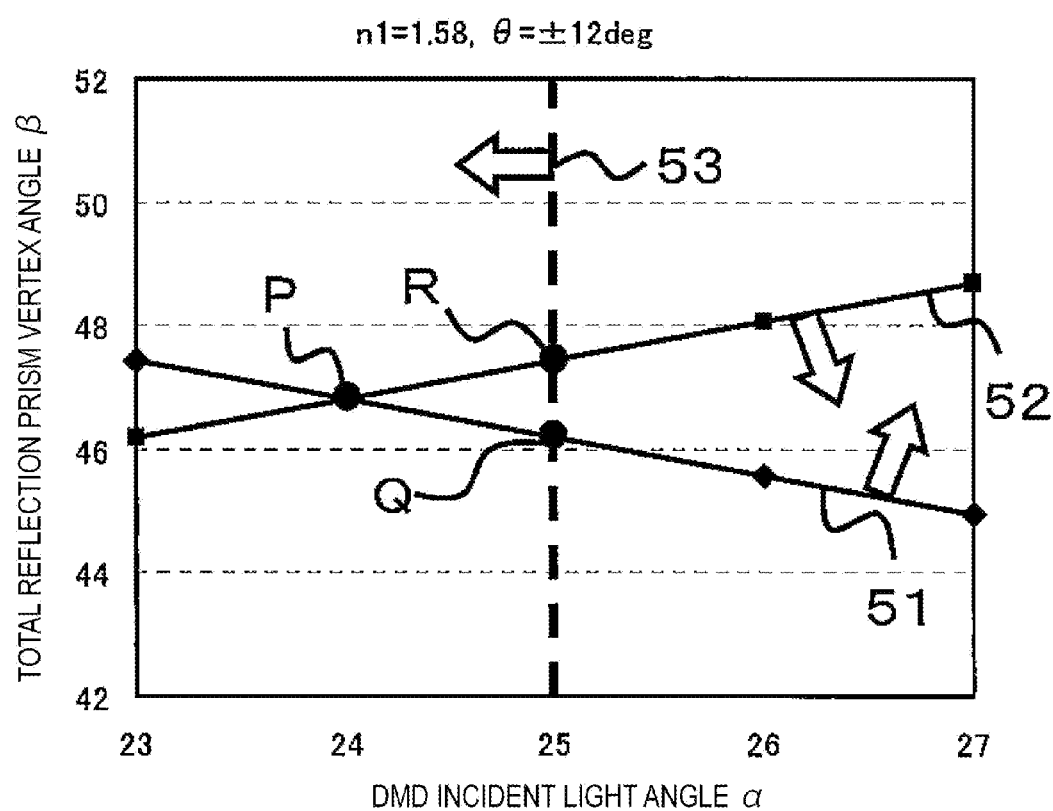
FIG. 5A is a diagram illustrating a relation 1 of a vertex angle of a total reflection prism and a DMD incident light angle.
Figure 5B:
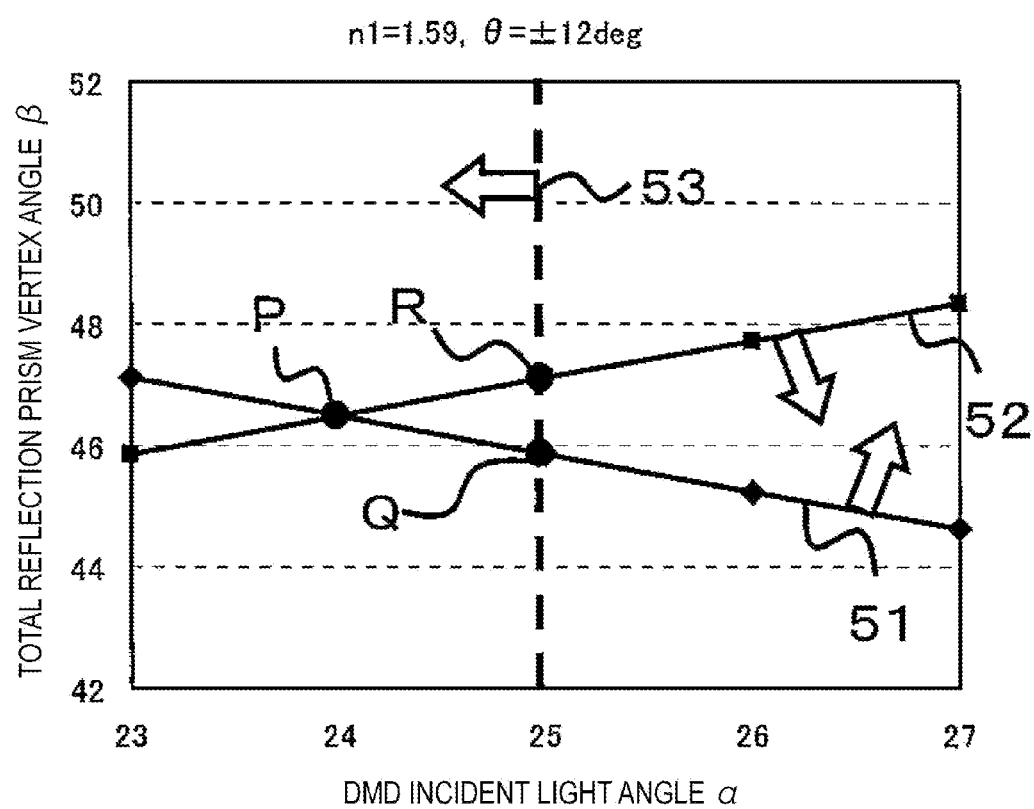
FIG. 5B is a diagram illustrating a relation 2 of a vertex angle of a total reflection prism and a DMD incident light angle.
Figure 5C:
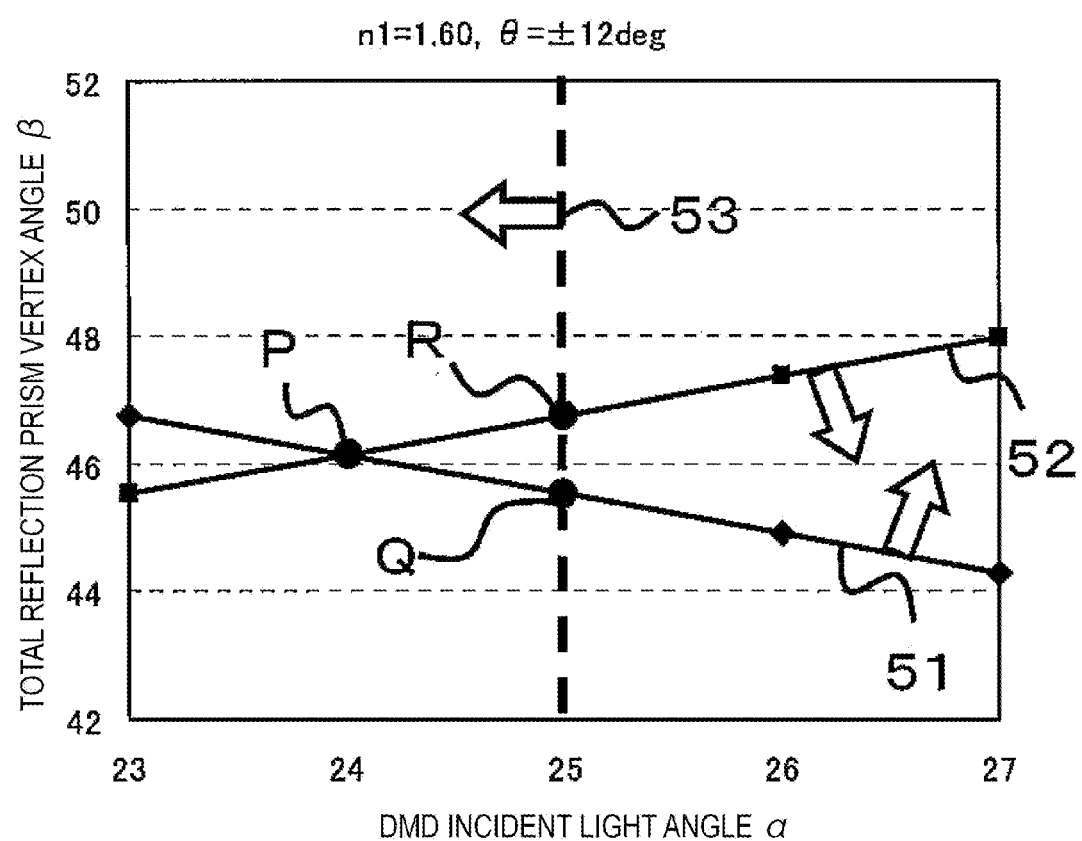
FIG. 5C is a diagram illustrating a relation 3 of a vertex angle of a total reflection prism and a DMD incident light angle.
Figure 5D:
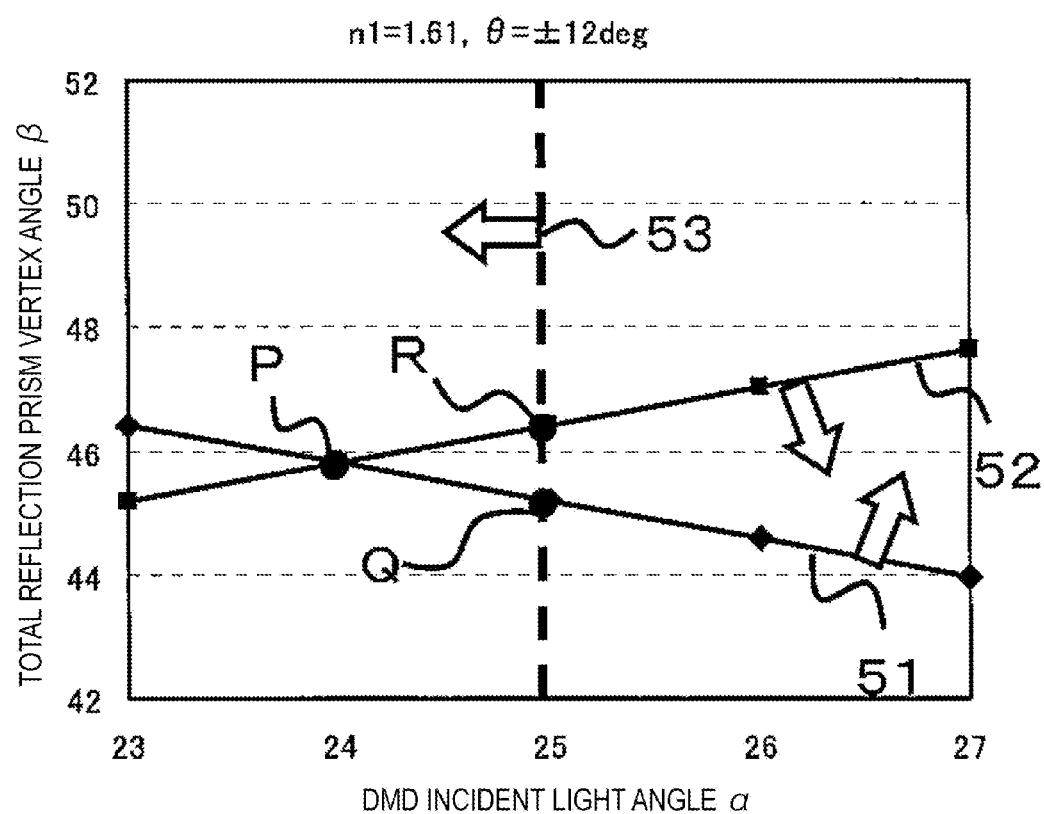
FIG. 5D is a diagram illustrating a relation 4 of a vertex angle of a total reflection prism and a DMD incident light angle.

In FIGS. 5A to 5D, it is assumed that a refractive index of the total reflection prism 12 is 1.58 to 1.61 at a wavelength of 525 nm. FIG. 5A is a graph illustrating a relation of α and β when a refractive index n1 is 1.58, FIG. 5B is a graph illustrating a relation of α and β when the refractive index n1 is 1.59, FIG. 5C is a graph illustrating a relation of α and β when the refractive index n1 is 1.60, and FIG. 5D is a graph illustrating a relation of α and β when the refractive index n1 is 1.61.

Generally, in the case of a glass material having a large refractive index, a cost of the glass material increases and wavelength dependency of transmittance is degraded. However, in the case of a glass material having a small refractive index, the critical angle δ1 of the total reflection prism 12 may also become small and a condition to satisfy the expression (11) becomes an unrealistic value. From this, it has been assumed that the refractive index is 1.58 to 1.61. The refractive index n1 is determined, so that the critical angle δ1 of the total reflection prism 12 is also determined.

The expression (11) becomes an inequality expression illustrating a relation of α and β by setting the DMD rotation angle θ and the refractive index n1 of the total reflection prism, that is, the critical angle δ1 to predetermined values. FIGS. 5A to 5D are diagrams illustrating the relation of the DMD incident light angle α and the vertex angle β of the total reflection prism in which there is not efficiency loss of both the incident light and the reflected light, determined by the expression (11).

In FIGS. 5A to 5D, a straight line 51 shows a condition in which the DMD reflected light is totally reflected from the total reflection surface 12a of the total reflection prism 12, shown by the expression (9). In the case of a range wider than a range of the straight line 51, the reflected light is totally reflected. As illustrated in the drawings, if the vertex angle β of the total reflection prism increases in a state in which the same DMD incidence angle α is maintained, a total reflection condition in the total reflection surface 12a is alleviated.

A straight line 52 is a condition in which the DMD incident light transmits the emission surface 11b of the correction prism 11, shown by the expression (10). In the case of a range narrower than a range of the straight line 52, the incident light is transmitted. In contrast, if the vertex angle β of the total reflection prism increases in a state in which the same DMD incidence angle α is maintained, a part of light beams may be totally reflected. For this reason, the vertex angle β is preferably small.

Meanwhile, the incidence angle α of the DMD incident light is most generally an angle of 2θ with respect to a center optical axis of the DMD. Meanwhile, even when α is an angle larger than 2θ, β satisfying the expression (11) exists. In addition, if a manufacturing variation of θ or n1 is considered, it is preferable that α be larger than 2θ.

However, if α increases, some problems related to the DMD reflected light occur. One is that a light path length difference of light beams reflected from both ends of the DMD increases. If the light path length difference increases, an image formation relation of light beams having passed through the projective lens on the screen is degraded and video is blurred. In addition, because the DMD reflected light is incident to be greatly inclined vertically with respect to the surface 12b of the total reflection prism, an increase in the angle α causes a problem of chromatic aberration by the wavelength to be remarkable. In addition, because a position of the DMD reflected light corresponding to the total reflection surface 12a is greatly shifted, there occurs a problem in that a size of the total reflection prism increases. Therefore, in the examples of FIGS. 5A to 5D, because the DMD rotation angle is ±12°, the incidence angle α has been determined as 25° or less by considering the above problem (shown by a broken line 53).

Referring to FIG. 5A, that is, the relation of α and β when the glass material having the refractive index n1=1.58 is used, 24°<α≤25°, 46.3°≤β≤47.4°, and a combination of α and β included in a range of a triangle surrounded with points P, Q, and R are preferable. Similarly, in the case of FIG. 5B, that is, when the glass material having the refractive index n1=1.59 is used, 24°<α≤25°, 45.9°≤β≤47.1°, and a combination of α and β included in a range of a triangle surrounded with points P, Q, and R are preferable. In the case of FIG. 5C, that is, when the glass material having the refractive index n1=1.60 is used, 24°<α≤25°, 45.6°≤β≤46.7°, and a combination of α and β included in a range of a triangle surrounded with points P, Q, and R are preferable. In the case of FIG. 5D, that is, when the glass material having the refractive index n1=1.61 is used, 24°<α≤25°, 45.3°≤β≤46.4°, and a combination of α and β included in a range of a triangle surrounded with points P, Q, and R are preferable.

As such, α and β are combined by predetermined values according to the refractive index n1 of the glass material of the total reflection prism, so that an optical unit not having total efficiency loss of incident light and emitted light can be realized.

Figure 6A:
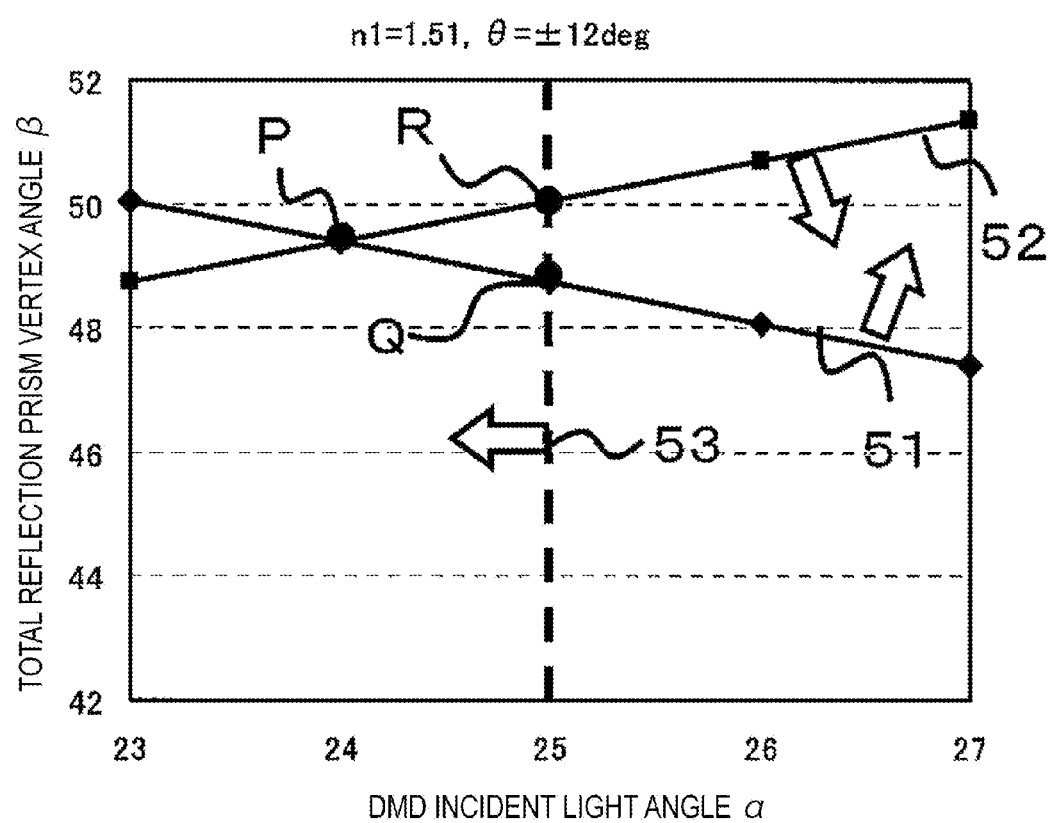
FIG. 6A is a diagram illustrating a relation 5 of a vertex angle of a total reflection prism and a DMD incident light angle.
Figure 6B:
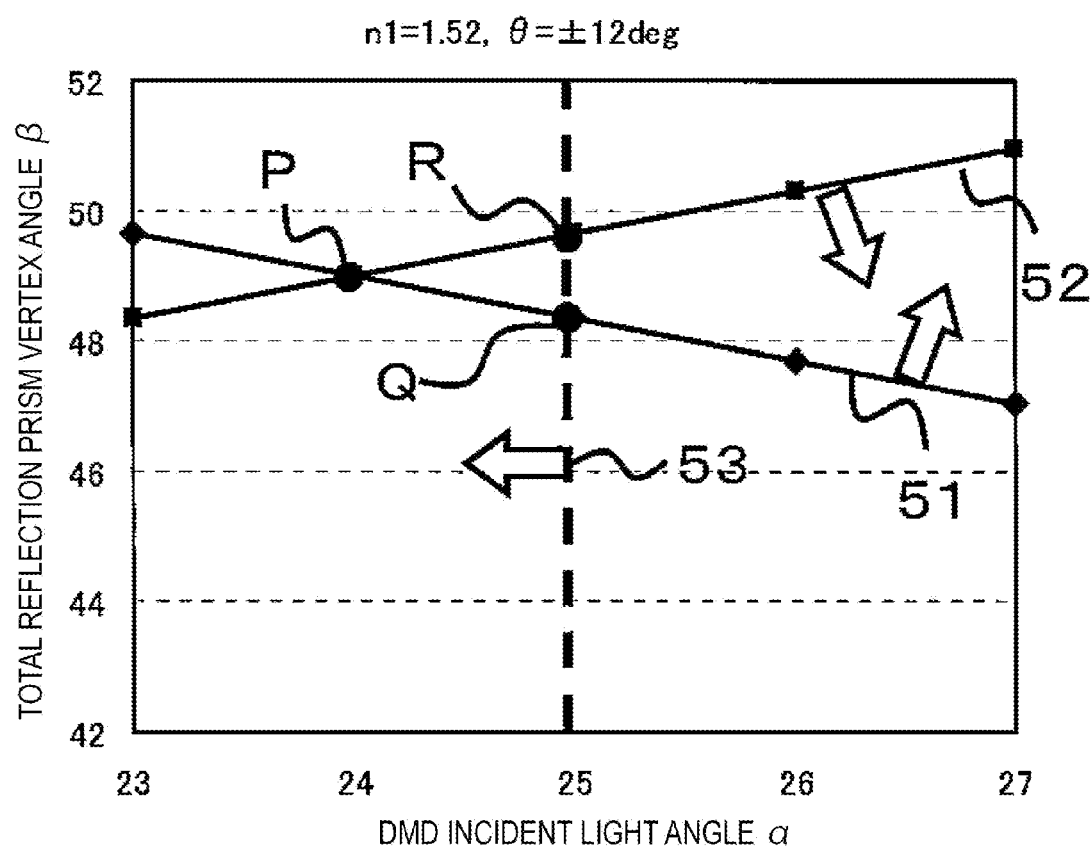
FIG. 6B is a diagram illustrating a relation 6 of a vertex angle of a total reflection prism and a DMD incident light angle.
Figure 6C:
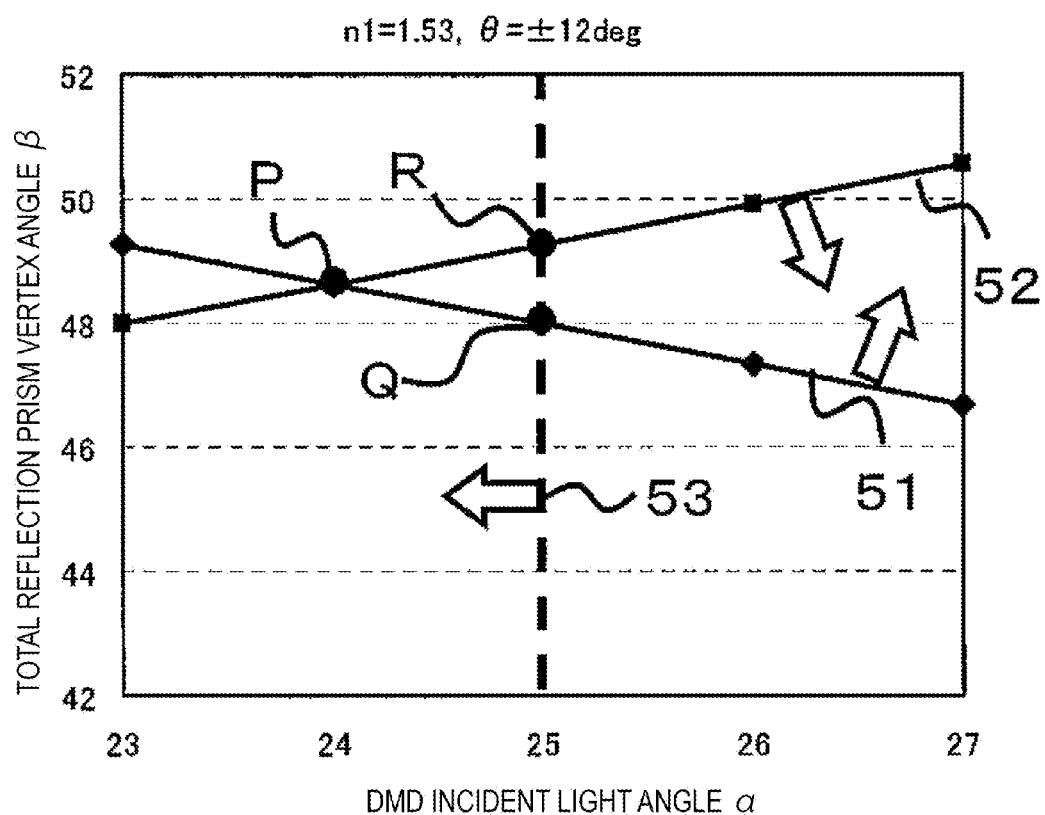
FIG. 6C is a diagram illustrating a relation 7 of a vertex angle of a total reflection prism and a DMD incident light angle.
Figure 6D:
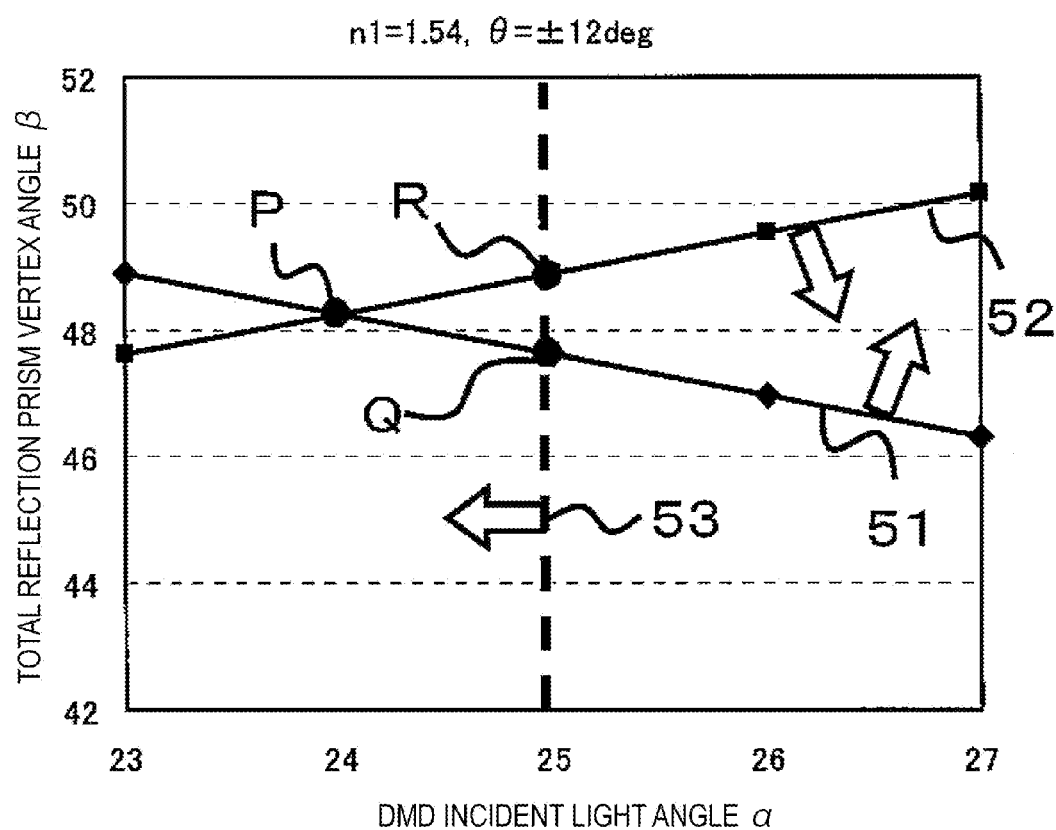
FIG. 6D is a diagram illustrating a relation 8 of a vertex angle of a total reflection prism and a DMD incident light angle.

In FIGS. 6A to 6D, it is assumed that a refractive index n1 of the glass material of the total reflection prism is a value smaller than the value in FIGS. 5A to 5D, when the representative value of the DMD rotation angle is ±12°, similar to FIGS. 5A to 5D. In FIGS. 6A to 6D, it is assumed that the refractive index of the total reflection prism 12 is 1.51 to 1.54 at a wavelength of 525 nm. FIG. 6A is a graph illustrating a relation of α and β when the refractive index n1 is 1.51, FIG. 6B is a graph illustrating a relation of α and β when the refractive index n1 is 1.52, FIG. 6C is a graph illustrating a relation of α and β when the refractive index n1 is 1.53, and FIG. 6D is a graph illustrating a relation of α and β when the refractive index n1 is 1.54. Because conditions of the solid line 51, the solid line 52, and the broken line 53 are the same as the conditions in FIGS. 5A to 5D, description thereof is omitted.

Referring to FIG. 6A, that is, the relation of α and β when the glass material having the refractive index n1=1.51 is used, 24°<α≤25°, 48.8°≤β≤50.0°, and a combination of α and β included in a range of a triangle surrounded with points P, Q, and R are preferable. Similarly, in the case of FIG. 6B, that is, when the glass material having the refractive index n1=1.52 is used, 24°<α≤25°, 48.4°≤β≤49.6°, and a combination of α and β included in a range of a triangle surrounded with points P, Q, and R are preferable. In the case of FIG. 6C, that is, when the glass material having the refractive index n1=1.53 is used, 24°<α≤25°, 48.0°≤β≤49.2°, and a combination of α and β included in a range of a triangle surrounded with points P, Q, and R are preferable. In the case of FIG. 6D, that is, when the glass material having the refractive index n1=1.54 is used, 24°<α≤25°, 47.7°≤β≤48.8°, and a combination of α and β included in a range of a triangle surrounded with points P, Q, and R are preferable.

As such, even when the refractive index of the total reflection prism is small, the vertex angle β is set as a large angle of about 47° to 50°, so that an optical unit not having total efficiency loss of incident light and emitted light can be realized.

FIGS. 7A to 7D are graphs illustrating a relation of the vertex angle β of the total reflection prism and the DMD incidence angle α with respect to the refractive index n1 of the total reflection prism, when the DMD rotation angle θ is in a range of 16° to 18° and θ=17° larger than those in the cases of FIGS. 5A to 6D is assumed as a representative value.

When the DMD rotation angle is ±17°, a light beam of ±17° is input to a principal light ray of the DMD incident light, so that maximum brightness can be realized. This means that a light beam is a light beam corresponding to an F number of 1.7.

Figure 7A:
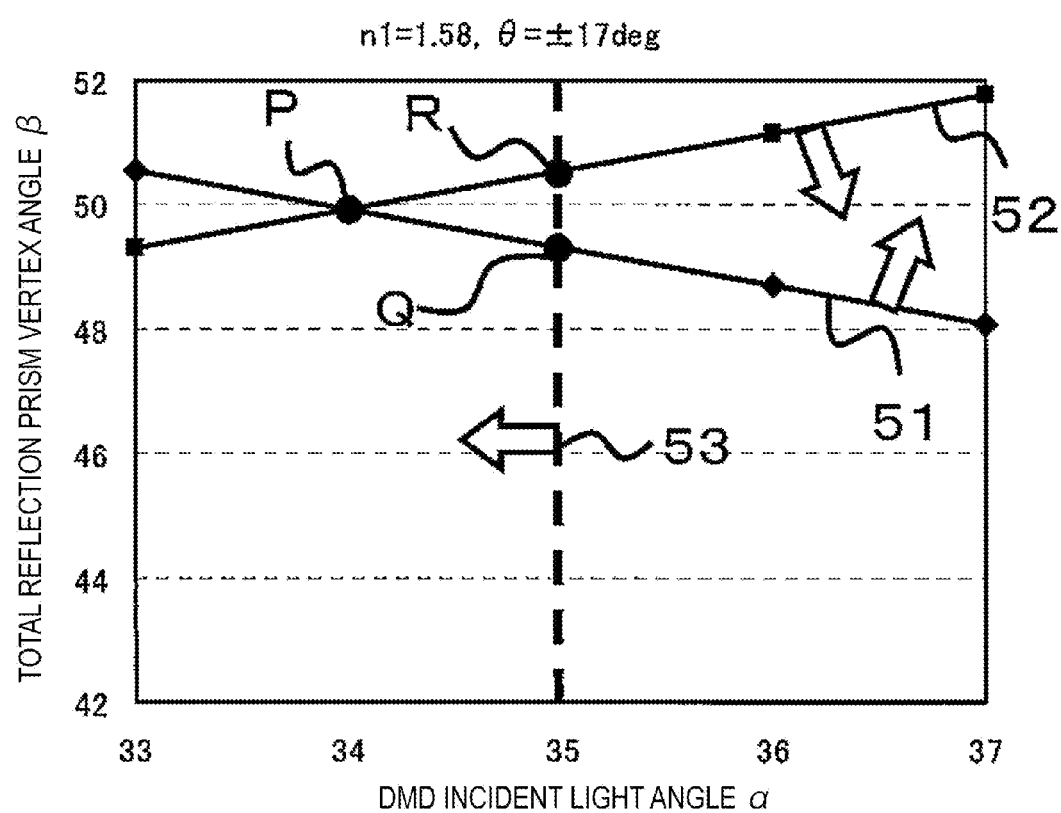
FIG. 7A is a diagram illustrating a relation 9 of a vertex angle of a total reflection prism and a DMD incident light angle.
Figure 7B:
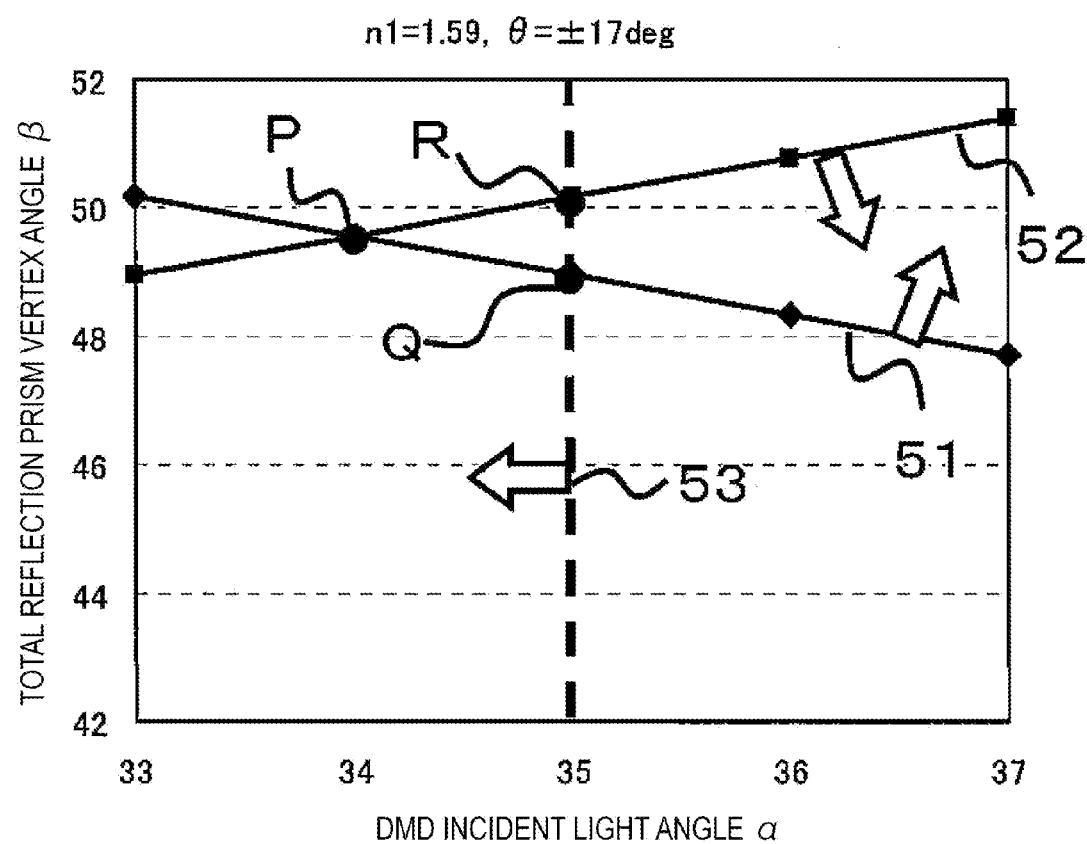
FIG. 7B is a diagram illustrating a relation 10 of a vertex angle of a total reflection prism and a DMD incident light angle.
Figure 7C:
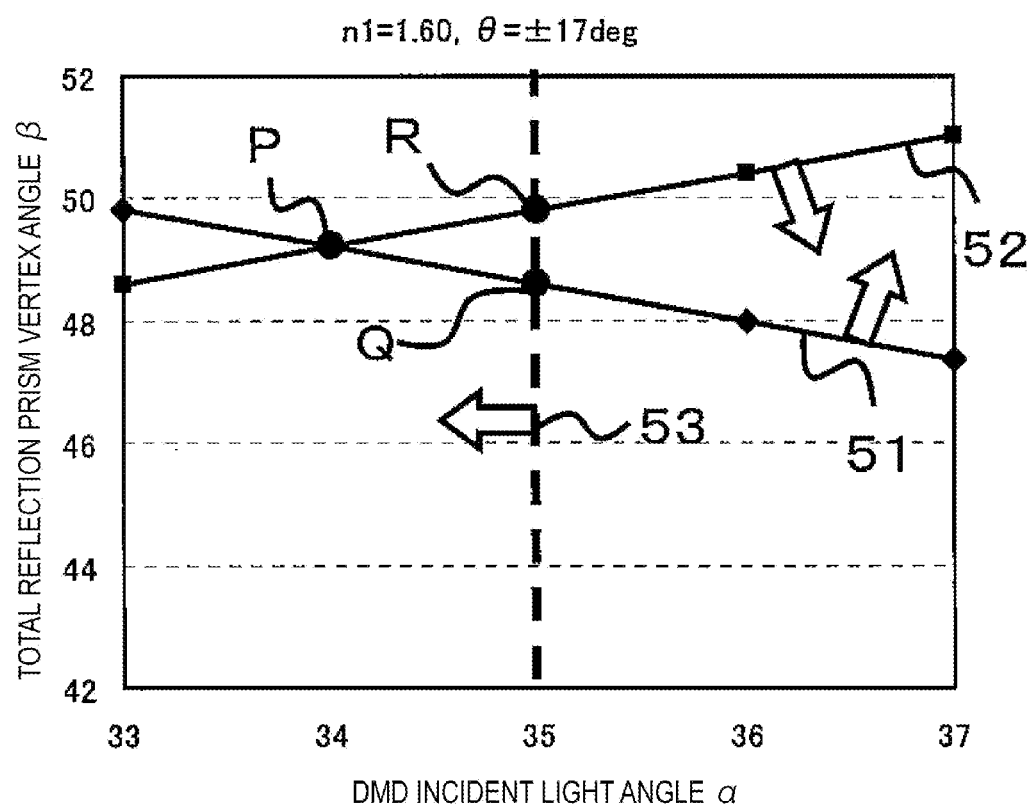
FIG. 7C is a diagram illustrating a relation 11 of a vertex angle of a total reflection prism and a DMD incident light angle.
Figure 7D:
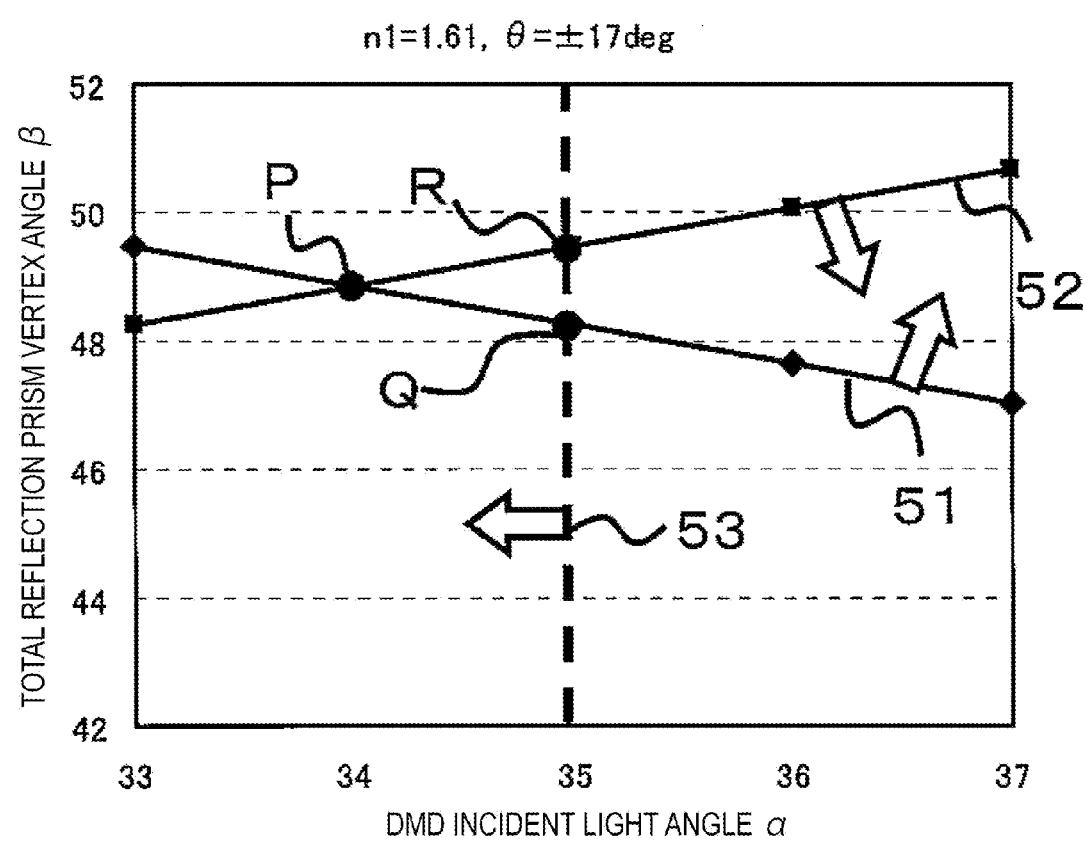
FIG. 7D is a diagram illustrating a relation 12 of a vertex angle of a total reflection prism and a DMD incident light angle.

In FIGS. 7A to 7D, it is assumed that a refractive index of the total reflection prism 12 is 1.58 to 1.61 at a wavelength of 525 nm. FIG. 7A is a graph illustrating a relation of α and β when a refractive index n1 is 1.58, FIG. 7B is a graph illustrating a relation of α and β when the refractive index n1 is 1.59, FIG. 7C is a graph illustrating a relation of α and β when the refractive index n1 is 1.60, and FIG. 7D is a graph illustrating a relation of α and β when the refractive index n1 is 1.61.

In the examples of FIGS. 7A to 7D, because the DMD rotation angle is ±17°, the incidence angle α has been determined as 35° or less by considering the problem of the light path length difference or the chromatic aberration described above (shown by a broken line 53). Referring to FIG. 7A, that is, the relation of α and β when the glass material having the refractive index n1=1.58 is used, 34°<α≤35°, 49.4°≤β≤50.5°, and a combination of α and β included in a range of a triangle surrounded with points P, Q, and R are preferable. Similarly, in the case of FIG. 7B, that is, when the glass material having the refractive index n1=1.59 is used, 34°<α≤35°, 49.0°≤β≤50.1°, and a combination of α and β included in a range of a triangle surrounded with points P, Q, and R are preferable. In the case of FIG. 7C, that is, when the glass material having the refractive index n1=1.60 is used, 34°<α≤35°, 48.7°≤β≤49.8°, and a combination of α and β included in a range of a triangle surrounded with points P, Q, and R are preferable. In the case of FIG. 7D, that is, when the glass material having the refractive index n1=1.61 is used, 34°<α≤35°, 48.3°≤β≤49.4°, and a combination of α and β included in a range of a triangle surrounded with points P, Q, and R are preferable.

As such, even when the DMD rotation angle increases, the vertex angle β is set as a large angle of about 48 to 50.5°, so that an optical unit not having total efficiency loss of incident light and emitted light can be realized, even though a glass material having a small refractive index of about 1.59 is used.

Figure 8A:
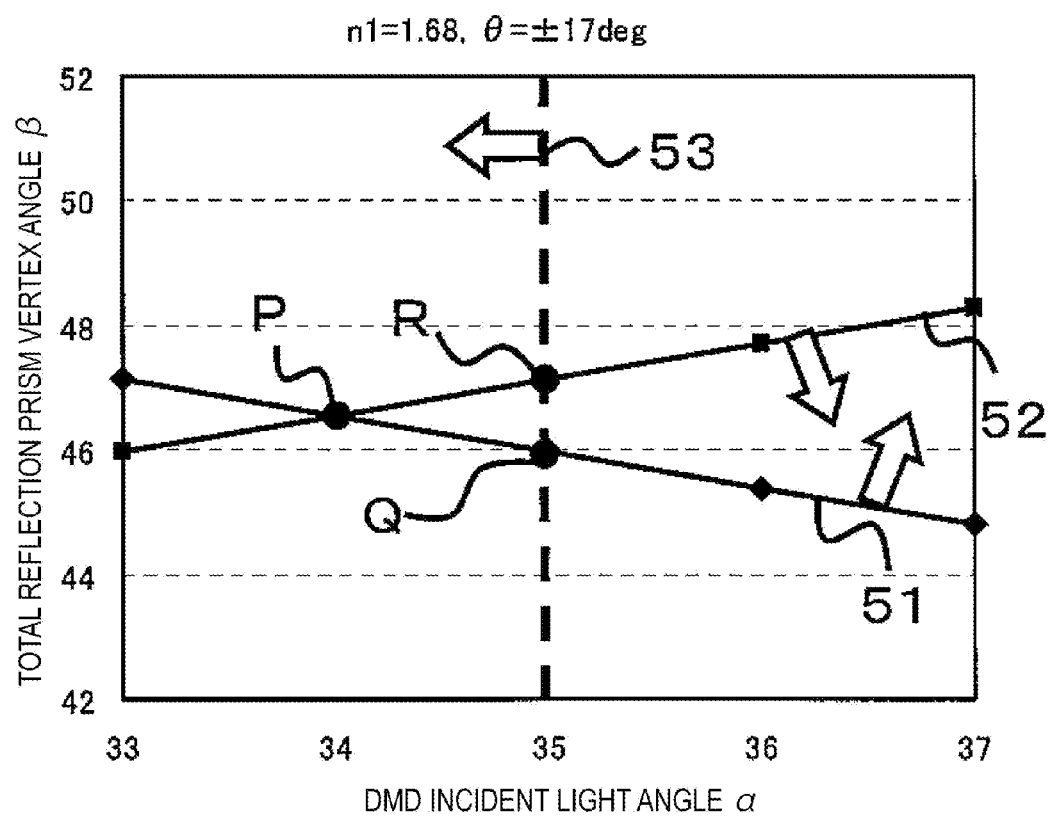
FIG. 8A is a diagram illustrating a relation 13 of a vertex angle of a total reflection prism and a DMD incident light angle.
Figure 8B:
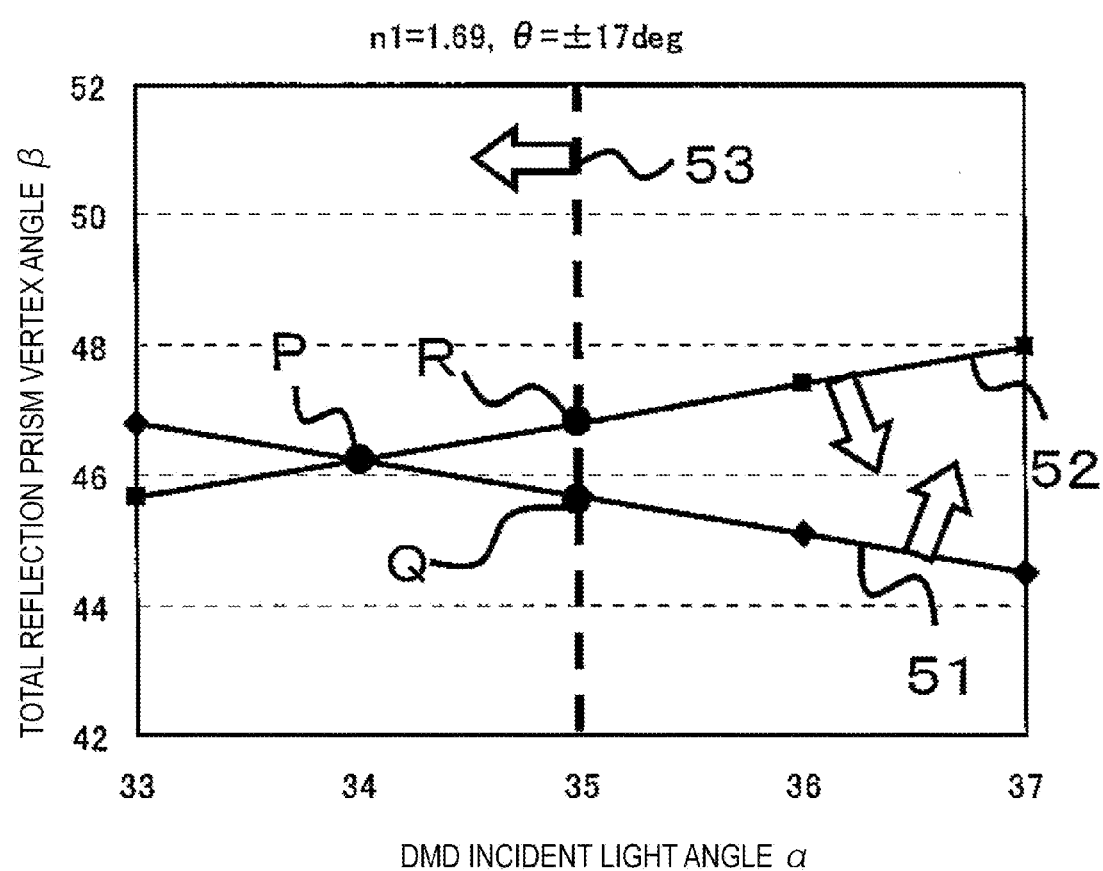
FIG. 8B is a diagram illustrating a relation 14 of a vertex angle of a total reflection prism and a DMD incident light angle.
Figure 8C:
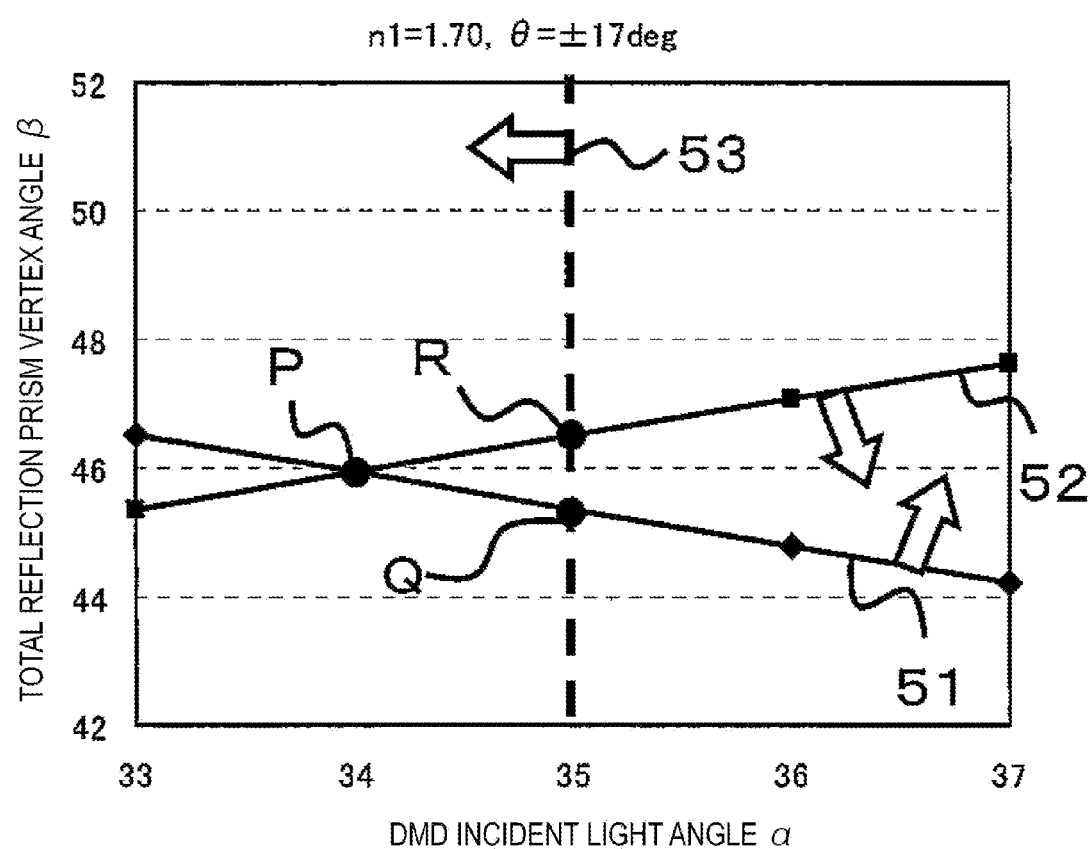
FIG. 8C is a diagram illustrating a relation 15 of a vertex angle of a total reflection prism and a DMD incident light angle.
Figure 8D:
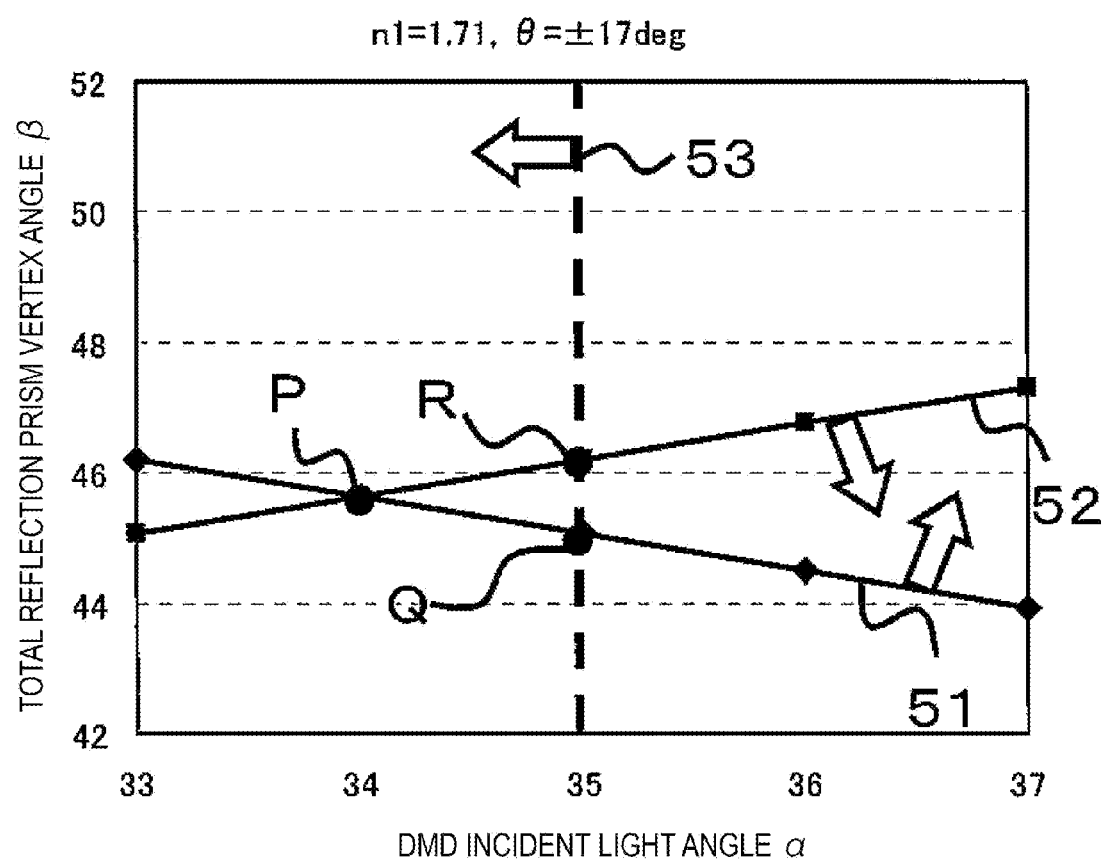
FIG. 8D is a diagram illustrating a relation 16 of a vertex angle of a total reflection prism and a DMD incident light angle.

In FIGS. 8A to 8D, it is assumed that a refractive index n1 of the glass material of total reflection prism 12 is a value larger than the value in FIGS. 7A to 7D, when a representative value of the DMD rotation angle is ±17, similar to FIGS. 7A to 7D. In FIGS. 8A to 8D, it is assumed that the refractive index of the total reflection prism 12 is 1.68 to 1.71 at a wavelength of 525 nm. FIG. 8A is a graph illustrating a relation of α and β when the refractive index n1 is 1.68, FIG. 8B is a graph illustrating a relation of α and β when the refractive index n1 is 1.69, FIG. 8C is a graph illustrating a relation of α and β when the refractive index n1 is 1.70, and FIG. 8D is a graph illustrating a relation of α and β when a refractive index n1 is 1.71. Because conditions of the solid line 51, the solid line 52, and the broken line 53 are the same as the conditions in FIGS. 7A to 7D, description thereof is omitted.

Referring to FIG. 8A, that is, the relation of α and β when the glass material having the refractive index n1=1.68 is used, 34°<α≤35°, 46.0°≤β≤47.1°, and a combination of α and β included in a range of a triangle surrounded with points P, Q, and R are preferable. Similarly, in the case of FIG. 8B, that is, when the glass material having the refractive index n1=1.69 is used, 34°<α≤35°, 45.7°≤β≤46.8°, and a combination of α and β included in a range of a triangle surrounded with points P, Q, and R are preferable. In the case of FIG. 8C, that is, when the glass material having the refractive index n1=1.70 is used, 34°<α≤35°, 45.4°≤β≤46.5°, and a combination of α and β included in a range of a triangle surrounded with points P, Q, and R are preferable. In the case of FIG. 8D, that is, when the glass material having the refractive index n1=1.71 is used, 34°<α≤35°, 45.1°≤β≤46.1°, and a combination of α and β included in a range of a triangle surrounded with points P, Q, and R are preferable.

As such, the refractive index of the total reflection prism is set as about 1.69, so that the vertex angle β can be set as about 45° to 47°. Therefore, an image forming optical system can be further downsized and an optical unit not having total efficiency loss of incident light and emitted light can be realized.

As described above, the total reflection prism having the vertex angle and the configuration of the incident light angle illustrated in this embodiment are realized, so that a high-brightness optical unit in which a cost of the total reflection prism is cheap, image formation performance is not degraded, and there is not total efficiency loss can be provided.

However, the numerical values or the ranges assumed in this embodiment are only exemplary and the present invention is not limited thereto. For example, a DMD incident light angle and a vertex angle of the total reflection prism in a range in which the expression (11) is satisfied, even when the refractive index of the glass material or the combination of the DMD rotation angles changes, can be configured.

Second Embodiment

In the first embodiment described above, the DMD has been exemplified as the video display element. However, it is needless to say that the video display element is not limited to the DMD. Any video display element that can reflect light incident at a certain angle at a predetermined reflection angle may be used. For example, the case of including a video display element in which a principal light ray of incident light is incident at an angle α with respect to a normal of the video display element and the principal light ray is reflected at an angle ε with respect to the normal of the video display element is considered. As an example of this video display element, there is a reflective liquid crystal device.

At this time, a light beam having a spread of a predetermined effective F number needs to be separated by incidence and reflection. If an actual light beam is propagated with a spread of ±θ with respect to a principal light ray angle, when an incidence angle of a principal light ray of the incident light is α, a light beam of an angle of α−θ to α+θ is actually incident as an effective light beam and when a reflection angle of a principal light ray of the reflected light is ε, a light beam of an angle of ε−θ to ε+θ is actually reflected as an effective light beam. In addition, the incident/reflected light beams are most efficiently separated, when the incident/reflected light beams are adjacent to each other.

That is, the incident/reflected light beams are most efficiently separated, when α−θ and ε−θ become the same angle. If symbols are considered, α, ε, and θ can be represented by an expression (12).

$$\epsilon = \alpha - 2\theta \tag{12}$$

Here, θ shows a DMD rotation angle and a spread of an F number as described in the embodiment of the DMD. For this reason, if the expression (12) is substituted for the expression (11) and θ is deleted, a condition of a vertex β of the total reflection prism necessary for removing total efficiency loss of the DMD incident light and the DMD reflected light can be represented by an expression (13), using an incidence angle α and a reflection angle ϵ of the video display element.

$$\sin((\alpha-3\epsilon)/2) < n1^*\sin(\beta-\sin^{-1}(1/n1)) < \sin((\alpha+\epsilon)/2) \quad (13)$$

As such, even though the video display element is a general reflection element not to be the DMD, a configuration of the total reflection prism of a vertex angle β satisfying the expression (13) is taken, so that both the DMD incident light and DMD emitted light can be propagated without loss. Therefore, an image on a screen is bright and a high-brightness projector can be realized.

In addition, a projective display device in which the optical unit 100 described in this embodiment is combined with a power supply unit, a driving circuit unit such as a light source or a video display element, and a signal processing unit can realize a high-brightness projective display device not having efficiency loss.

The present invention is not limited to the embodiments described above and various modifications are included in the present invention. For example, the embodiments described above are only exemplary embodiments used to easily describe the present invention and the present invention is not limited to all the configurations described above.

What is claimed is:

1. An optical unit of a projective display device on which light source light is incident and which projects the light source light reflected by a video display element, the optical unit comprising:

a plurality of prisms each having a refraction surface or a total reflection surface of the light source light, wherein one prism of the plurality of prisms has a first boundary surface which is arranged in parallel to an emission surface of the light source light of the other prism at a predetermined distance and on which the light source light from the other prism is incident, and a second boundary surface which is provided to face the video display element and emits the light source light illuminating the video display element and on which reflected light from the video display element is incident;

when a refractive index of the prism is set as n, an angle formed by the first boundary surface and the second boundary surface is set as β, an emission angle of the light source light with respect to the video display element in the second boundary surface is set as α, and an incidence angle of the reflected light from the video display element in the second boundary surface is set as ϵ, a relation of $\sin((\alpha-3\epsilon)/2) < n1^*\sin(\beta-\sin^{-1}(1/n1)) < \sin((\alpha+\epsilon)/2)$ is satisfied; and the reflected light from the video display element which has been incident from the second boundary surface is totally reflected by the first boundary surface.

2. An optical unit of a projective display device on which light source light is incident and which projects the light source light reflected by a video display element including a plurality of minute mirrors swinging at a predetermined angle, the optical unit comprising:

a plurality of prisms each having a refraction surface or a total reflection surface of the light source light, wherein on prism of the plurality of prisms has a first boundary surface which is arranged in parallel to an emission surface of the light source light of the other prism at a predetermined distance and on which the light source light from the other prism is incident, and a second boundary surface which is provided to face the video display element and emits the light source light illuminating the video display element and on which reflected light from the video display element is incident;

when a swinging angle of the minute mirrors of the video display element is set as ±θ, a refractive index of the prism is set as n, an angle formed by the first boundary surface and the second boundary surface is set as β, and an emission angle of the light source light with respect to the video display element in the second boundary surface is set as α, a relation of $-\sin(\alpha-3\theta) < n1^*\sin(\beta-\sin^{-1}(1/n1)) < \sin(\alpha-\theta)$ is satisfied;

and the reflected light from the video display element which has been incident from the second boundary surface is totally reflected by the first boundary surface.

3. The optical unit according to claim 2, wherein:
the swinging angle θ of the minute mirrors of the video display element is in a range of 11° to 13°;
the refractive index n of the prisms is in a range of 1.58 to 1.61;
the emission angle α is in a range of angles larger than 24°; and
the angle β of the prisms satisfies 45.3°≤β≤47.4°.

4. The optical unit according to claim 2, wherein:
the swinging angle θ of the minute mirrors of the video display element is in a range of 11° to 13°;
the refractive index n of the prisms is in a range of 1.51 to 1.54;
the emission angle α is in a range of angles larger than 24°; and
the angle β of the prisms satisfies 47.7°≤β≤50.0°.

5. The optical unit according to claim 2, wherein:
the swinging angle θ of the minute mirrors of the video display element is in a range of 16° to 18°;
the refractive index n of the prisms is in a range of 1.58 to 1.61;
the emission angle α is in a range of angles larger than 34°; and
the angle β of the prisms satisfies 48.3°≤β≤50.5°.

6. The optical unit according to claim 2, wherein:
the swinging angle θ of the minute mirrors of the video display element is in a range of 16° to 18°;
the refractive index n of the prisms is in a range of 1.68 to 1.71;
the emission angle α is in a range of angles larger than 34°; and
the angle β of the prisms satisfies 45.1°≤β≤47.1°.

* * * * *